US009457744B2

United States Patent
Saito (10) Patent No.: US 9,457,744 B2
(45) Date of Patent: Oct. 4, 2016

(54) POWER SUPPLY CONTROL DEVICE AND INSTRUMENT DEVICE

(71) Applicant: NIPPON SEIKI CO., LTD., Niigata (JP)

(72) Inventor: Ryuji Saito, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 34 days.

(21) Appl. No.: 14/414,421

(22) PCT Filed: Jul. 9, 2013

(86) PCT No.: PCT/JP2013/068692
§ 371 (c)(1),
(2) Date: Jan. 12, 2015

(87) PCT Pub. No.: WO2014/017286
PCT Pub. Date: Jan. 30, 2014

(65) Prior Publication Data
US 2015/0165909 A1 Jun. 18, 2015

(30) Foreign Application Priority Data

Jul. 26, 2012 (JP) .................................. 2012-165968

(51) Int. Cl.
*B60R 16/03* (2006.01)
*B60K 37/02* (2006.01)
*B60R 16/02* (2006.01)

(52) U.S. Cl.
CPC ............... *B60R 16/03* (2013.01); *B60K 37/02* (2013.01); *B60R 16/02* (2013.01); *B60K 2350/35* (2013.01);
(Continued)

(58) Field of Classification Search
CPC .............. B60K 37/02; B60K 2350/35; B60K 2350/352; B60R 16/02; B60R 16/03; B60R 2300/40; B60R 2300/404; B60R 2300/408
See application file for complete search history.

(56) References Cited

U.S. PATENT DOCUMENTS 4,156,151 A * 5/1979 Borroni ............... B60R 16/0315
307/10.1
5,986,350 A * 11/1999 Hirano .................... B60R 16/03
307/10.1
(Continued)

FOREIGN PATENT DOCUMENTS

JP 11-127608 A 5/1999
JP 2006-320065 A 11/2006
(Continued)

OTHER PUBLICATIONS

International Search Report issued in Intenational Application No. PCT/JP2013/068692 dated Oct. 15, 2013, with English translation.

*Primary Examiner* — Dale W Hilgendorf
(74) *Attorney, Agent, or Firm* — McDermott Will & Emery LLP (57) ABSTRACT

A power supply control device is configured to reduce a current supplying capacity required by a power supply even when power is supplied to a prescribed external device. The power supply control device comprises a first power supply for supplying power to a pointer instrument; a first control unit that operates with power from the first power supply and controls driving of the pointer instrument and supply of power from the first power supply to the pointer instrument; and a second control unit for controlling supply of power from the first power supply to an external memory. Upon receiving a prescribed command, the first power supply stops supplying power to the pointer instrument, and the first power supply starts supplying power to the external memory in response to the stoppage.

7 Claims, 3 Drawing Sheets

(52) U.S. Cl.
CPC ...... *B60K 2350/352* (2013.01); *B60R 2300/40* (2013.01); *B60R 2300/404* (2013.01); *B60R 2300/408* (2013.01)

(56) References Cited

U.S. PATENT DOCUMENTS

| | | | | |
|---|---|---|---|---|
| 6,707,388 | B2* | 3/2004 | Adams | H02P 8/00 |
| | | | | 116/284 |
| 7,750,497 | B2* | 7/2010 | Hashimoto | H02J 1/14 |
| | | | | 307/10.1 |
| 2009/0183018 | A1* | 7/2009 | Nakamura | B60W 50/04 |
| | | | | 713/323 |
| 2009/0289498 | A1* | 11/2009 | Hontani | B60R 16/03 |
| | | | | 307/10.1 |
| 2010/0231037 | A1* | 9/2010 | Esaka | H02J 7/0032 |
| | | | | 307/9.1 |
| 2011/0072123 | A1* | 3/2011 | Hsu | B60K 37/02 |
| | | | | 709/223 |

FOREIGN PATENT DOCUMENTS

| | | |
|---|---|---|
| JP | 2008-137472 A | 6/2008 |
| JP | 2009-166549 A | 7/2009 |
| JP | 2010-089763 A | 4/2010 |
| JP | 2010-188961 A | 9/2010 |
| JP | 2011-063234 A | 3/2011 |
| JP | 2011-126535 A | 6/2011 |
| JP | 2012-121533 A | 6/2012 |

* cited by examiner

POWER SUPPLY CONTROL DEVICE AND INSTRUMENT DEVICE

RELATED APPLICATIONS

This application is the U.S. National Phase under 35 U.S.C. §371 of International Application No. PCT/JP2013/068692, filed on Jul. 9, 2013, which in turn claims the benefit of Japanese Application No. 2012-165968, filed on Jul. 26, 2012, the disclosures of which are incorporated by reference herein.

TECHNICAL FIELD

The present invention relates to a power supply control device and an instrument device equipped with the power supply control device.

BACKGROUND ART

A conventional power supply control device is disclosed in PTL 1, for example.

The power supply control device (electronic control device for a vehicle, as referred in PTL 1) disclosed in PTL 1 includes a main microcontroller, a sub microcontroller, a first power supply means for supplying voltage to actuate the main microcontroller, and a second power supply means for supplying voltage to actuate the sub microcontroller. The main microcontroller is started up when a prescribed startup condition is satisfied. The main microcontroller started up determines whether or not to actuate the sub microcontroller. Based on the result of the determination, supply of power from the second power supply means to the sub microcontroller is controlled.

CITATION LIST

Patent Literature

[PTL 1] JP-A-2009-166549

SUMMARY OF INVENTION

Technical Problem

In the configuration of the power supply control device disclosed in PTL 1, for example, when power is supplied from the first power supply means to an external device connected, it is necessary for the first power supply means to have a current supply capacity in excess of not only the current consumption of the main microcontroller but also total current consumption that is obtained by adding at least the current consumption of the external device to the current consumption of the main microcontroller. That is, when power is supplied to the external device in this way, a power supply means is required which has a current supply capacity of a larger value corresponding to the current consumption of the external device. Generally, as the value of current that can be supplied becomes greater (i.e., when a current supply capacity required by the power supply means is increased), the cost of the power supply means configured by a power supply IC or the like is increased and thus this is not desirable.

The present invention has been made in consideration of the above situations and an object thereof is to provide a power supply control device configured such that a current supply capacity required by a power supply means can be suppressed even when power is supplied to a prescribed external device, and an instrument device equipped with the power supply control device.

Solution to Problem

In order to achieve the above object, a power supply control device according to a first aspect of the present invention includes a power supply means configured to supply power to a pointer instrument that notifies a predetermined measurement amount by a comparison between a rotating pointer and an indicator indicated by the pointer;

a first control unit operated by the power supplied from the power supply means and configured to control driving of the pointer instrument and supply of power from the power supply means to the pointer instrument; and a second control unit capable of being electrically connected to a prescribed external device and configured to control supply of power from the power supply means to the external device, in which the external device is operated by the power supplied from the power supply means, upon receiving a prescribed input command, the first control unit causes the power supply means to stop supplying power to the pointer instrument and, in response to the stoppage, the second control unit causes the power supply means to start supplying power to the external device that is electrically connected to the second control unit.

In the power supply control device, the second control unit may be operated by the power supplied from a second power supply means different from a first power supply means that is the power supply means, control a display operation of a display means to display a prescribed image and control supply of power from the first power supply means to the external device.

In order to achieve the above object, an instrument device according to a second aspect of the present invention includes the power supply control device, the pointer instrument and the display means.

Advantageous Effects of Invention

According to the present invention, it is possible to provide a power supply control device configured such that a current supply capacity required by a power supply means can be reduced even when power is supplied to a prescribed external device, and an instrument device equipped with the power supply control device.

EMBODIMENT FOR CARRYING OUT INVENTION

A power supply control device according to an illustrative embodiment of the present invention will be described with reference to the drawings.

Figure 1:
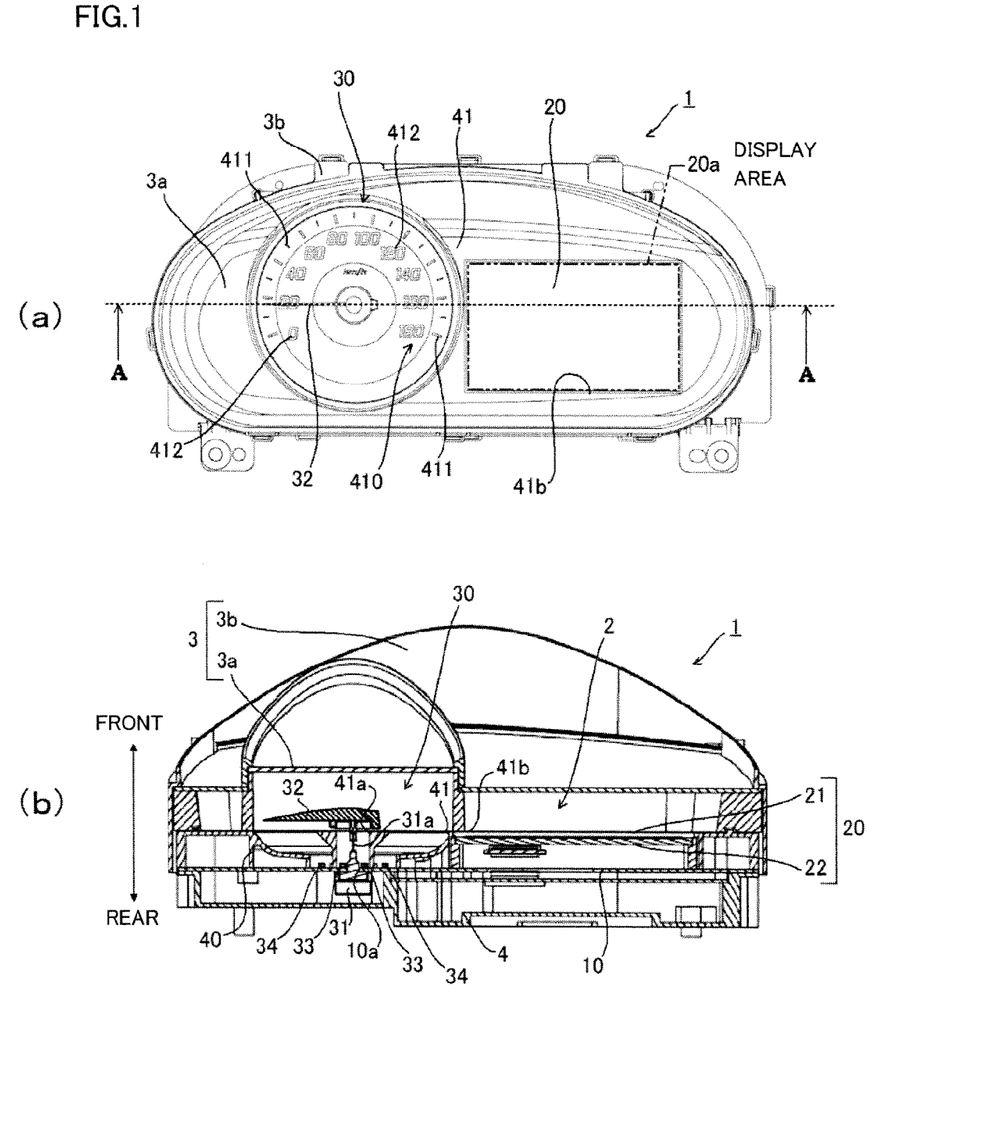
FIG. 1(a) is a front view of an instrument device according to an illustrative embodiment of the present invention and FIG. 1(b) is a schematic cross-sectional view taken along a line A-A of the instrument device shown in FIG. 1(a).

The power supply control device according to the present embodiment is configured as a part of an instrument device 1 shown in FIG. 1(*a*) and FIG. 1(*b*), which is mounted to a vehicle and notifies a vehicle speed or the like to a user (a vehicle driver).

As shown in FIG. 1(*b*), the instrument device 1 includes an instrument body 2, a front case 3 and a rear case 4. The instrument device 1 is configured by assembling the front case 3 and the rear case 4 in a state of accommodating the instrument body 2 therein. The front case 3 is positioned on the front side of the instrument body 2 and the rear case 4 is positioned on the rear side thereof.

Here, "the front" refers to a user side as seen from the front of the instrument device 1 (i.e., when a user confirms a vehicle speed or the like while seeing the instrument device 1 from the front) and "the rear" refers to an opposite side thereof (see FIG. 1(*b*)).

The instrument body 2 includes a circuit board 10, a display device 20, a pointer instrument 30, a main case 40 and a display plate 41.

The circuit board 10 is configured by a printed circuit board where a first control unit 100 and a second control unit 200 or the like, which will be described later, are mounted. A substrate of the circuit board 10 is formed of, e.g., glass epoxy resin. The substrate is formed with a through hole 10*a* through which a rotation shaft 31*a* of a motor 31 (to be described later) passes. For example, the first control unit 100 controls driving of the display device 20 and the motor 31 or the like in accordance with a signal (e.g., a signal of vehicle speed data) supplied from ECU (Electronic Control Unit) which is described later. Details of the first control unit 100 or the like will be described later.

The display device 20 is adapted to display an image for notifying various states on a display area 20*a* under the control of the first control unit 100 and the second control unit 200. The display device 20 is configured by a liquid crystal display that includes a TFT (Thin Film Transistor) type liquid crystal panel 21 and a backlight 22 located at the back of the liquid crystal panel 21. The backlight 22 is adapted to illuminate through the liquid crystal panel 21. The backlight 22 is configured by a light guide plate and a light source 22*a* (see FIG. 2) that is configured by an LED (Light Emitting Diode). Meanwhile, the display device 20 may be configured by an organic EL (Electro-Luminescence) display.

The pointer instrument 30 includes the motor 31, a pointer 32 that is rotated by the motor 31, a first light source 33 that illuminates the pointer 32, a second light source 34 that illuminates the display plate 41, and an indicator part 410 that is indicated by the pointer 32.

The motor 31 is configured by, e.g., a stepping motor and attached to the rear side of the circuit board 10. The motor 31 includes the rotation shaft 31*a* which passes through the through hole 10*a* and extends toward the front side from the rear side of the circuit board 10. The motor 31 rotates the rotation shaft 31*a* under the control of the first control unit 100.

The pointer 32 is attached to the rotation shaft 31*a*. The pointer 32 is rotated on the display plate 41 located on the front side of the main case 40 by the rotation of the rotation shaft 31*a* and indicates the indicator part 410 formed on the display plate 41. The indicator part 410 will be described later. Since the first control unit 100 causes the rotation shaft 31*a* of the motor 31 to be rotated in a rotation angle according to the vehicle speed data supplied from the outside, the pointer 32 can rotate in an angle according to a speed and indicate the indicator part 410. The pointer instrument 30 notifies a vehicle speed to a user by comparing and reading the pointer 32 and the indicator part 410.

The pointer 32 is made of light guide material and emits light by receiving and guiding the light from the first light source 33.

Each of the first light source 33 and the second light source 34 is an LED mounted on the front side of the substrate of the circuit board 10 and properly emits light under the control of the first control unit 100.

A plurality of first light sources 33 is provided near the rotation shaft 31*a*. The light emitted from the first light sources 33 passes through an illumination chamber provided in the main case 40 and illuminates the pointer 32 from the rear side.

A plurality of second light sources 34 is provided at outer positions of the first light sources 33 about the rotation shaft 31*a*. The light emitted from the second light sources 34 passes through an illumination chamber (e.g., an illumination chamber different from the illumination chamber corresponding to the first light source 33) provided in the main case 40 and illuminates the display plate 41 from the rear side.

The main case 40 is made of synthetic resin or the like. The circuit board 10 is attached to the rear side of the main case 40 and the display plate 41 is attached to the front side thereof.

The display plate 41 is configured by forming the indicator part 410 or the like on a plate-like substrate having a light-transmitting property. For example, the indicator part 410 is a part indicating scales 411 and characters (including numbers) 412 of the display plate 41 and is formed on the substrate. The indicator part 410 is formed by, e.g., subjecting the substrate to a printing or painting or the like. For example, the indicator part 410 is formed (in a so-called outline character shape) in such a way that the scales 411 and the characters 412 have a light-transmitting property and peripheries thereof have a light-shielding property. Thereby, when the light from the second light source 34 reaches the display plate 41, the indicator part 410 is adapted to emit light. For example, as shown in FIG. 1(*a*), the indicator part 410 is formed in an arc shape around the rotation shaft 31*a*. Further, the display plate 41 is formed with a through hole 41*a* and a window part 41*b*. The rotation shaft 31*a* passes through the through hole 41*a*. The window part 41*b* is configured by an opening to allow the display area 20*a* of the display device 20 to be seen. Meanwhile, the window part 41*b* may be configured such that the display area 20*a* can be seen by not providing paint or the like having a light-shielding property, instead of providing the opening.

As shown in FIG. 1(*a*), the front case 3 is configured by a light-transmissive member 3*a* and a light-shielding case 3*b*. The light-transmissive member 3*a* is formed by, e.g., visible-light transmissive glass or synthetic resin. The light-shielding case 3*b* is formed by, e.g., hard synthetic resin. The light-shielding case 3*b* is blackish and shields light. The light-transmissive member 3*a* and the light-shielding case 3*b* are fitted to each other by protrusions or the like provided in one or both thereof, thereby forming the front case 3.

The rear case 4 is formed by, e.g., hard synthetic resin and has a box shape whose front side is open. The front case 3 and the rear case 4 are combined so as to sandwich the instrument body 2 by protrusions or the like provided in one or both thereof.

Figure 2:
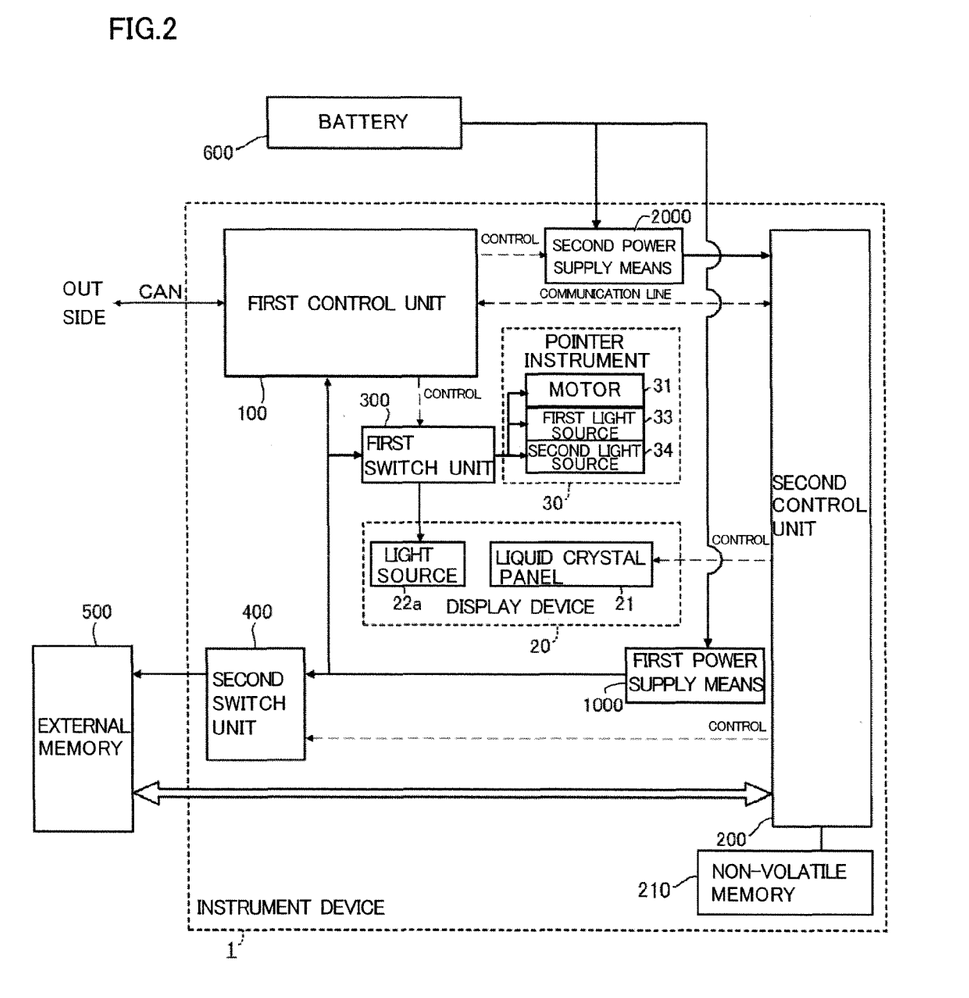
FIG. 2 is a block diagram for explaining an electrical configuration of the instrument device according to the illustrative embodiment of the present invention.

Next, an electrical configuration of the instrument device 1 will be described with reference to FIG. 2.

In addition to the components described above, the instrument device 1 includes the first control unit 100, the second control unit 200, a non-volatile memory 210, a first switch unit 300, a second switch unit 400, a first power supply means 1000 and a second power supply means 2000. These components are mounted on the circuit board 10 and configured as an electronic circuit including various electronic components.

The first control unit 100, the pointer instrument 30 (i.e., the motor 31, the first light source 33 and the second light source 34) and the light source 22a of the display device 20 are operated by the power supplied from the first power supply means 1000.

The second control unit 200 is operated by the power supplied from the second power supply means 2000.

The first power supply means 1000 is configured by a power supply IC (Integrated Circuit), steps down the power from a vehicle battery 600 and functions as a 5V power supply that applies voltage of 5V to each component. The first power supply means 1000 may apply voltage of other values to each component.

The second power supply means 2000 is configured by a power supply IC, steps down the power from the vehicle battery 600 and functions as a power supply that applies a predetermined voltage (3.3V, 1.5V, 1.2V, etc.) to the second control unit 200.

The first control unit 100 executes a process of controlling the entire operation of the instrument body 2 and is configured by a microcontroller including a CPU (Central Processing Unit), a ROM (Read Only Memory), a RAM (Random Access Memory) and an input/output interface or the like. The first control unit 100 executes a predetermined process (particularly, a data rewriting process to be described later) in such a way that the CPU reads out and executes a predetermined program that is previously stored in the ROM, for example. The RAM functions as a working memory when the CPU executes the process.

The first control unit 100 is electrically connected to the outside of the instrument device 1 such as ECU via a CAN (Controller Area Network) transceiver IC (e.g., mounted on the circuit board 10) and can communicate with the outside of the instrument device 1 by a CAN (Controller Area Network) communication, so that the first control unit 100 receives various information inputted from the outside. The ECU measures a vehicle speed or the like using various sensors and supplies the values of the measured vehicle speed or the like to the first control unit 100.

Particularly, in the present embodiment, the first control unit 100 can be electrically connected to a Diagnosis Tester via the CAN transceiver IC and receive a data rewriting request of the non-volatile memory 210 from the Diagnosis Tester. For example, the Diagnosis Tester is a dealer of a vehicle equipped with the instrument device 1 and is connected to the instrument device 1 (the first control unit 100) when rewriting the data of the non-volatile memory 210.

The first control unit 100 (CPU) is electrically connected to the pointer instrument 30 (the motor 31, the first light source 33 and the second light source 34) and the light source 22a of the display device 20 via various driver ICs (mounted on the circuit board 10) for driving these components. Further, the first control unit 100 is electrically connected to the second control unit 200. In addition, the first control unit 100 is electrically connected to each of the second power supply means 2000 and the first switch unit 300. Based on the various information received, the first control unit 100 executes a process of controlling each of these components via the various driver ICs or the second control unit 200. (That is, the first control unit 100 executes a process of controlling the whole instrument device 1.)

The second control unit 200 executes a process of controlling an operation of the liquid crystal panel 21 of the display device 20 and is configured by a graphic display controller (GDC) including a CPU, a ROM, a RAM and an input/output interface or the like. The second control unit 200 executes a predetermined process (particularly, a data rewriting process to be described later) in such a way that the CPU reads out and executes a predetermined program that is previously stored in the ROM, for example. Further, the second control unit 200 (CPU) is electrically connected to each of the non-volatile memory 210 and the second switch unit 400 and executes a process of controlling these components in accordance with the commands issued from the first control unit 100.

The non-volatile memory 210 is configured by a flash memory or the like and stores image data or data relating to application software, which is required for the operation of the second control unit 200.

Further, the second control unit 200 can be electrically connected to an external memory 500.

The external memory 500 is configured by, e.g., USB (Universal Serial Bus) memory and connected to the instrument device 1 when rewriting the data stored in the non-volatile memory 210. That is, the external memory 500 is normally adapted to store the image data or the application software, which is required for the operation of the second control unit 200. The instrument device 1 is provided with a terminal (e.g., USB terminal), which is not shown. When the external memory 500 is connected to the terminal, the external memory 500 is electrically connected to the second control unit 200. For example, the external memory 500 is a dealer of a vehicle equipped with the instrument device 1 and is connected to the instrument device 1 (the second control unit 200) when rewriting the data of the non-volatile memory 210. As will be described later, the external memory 500 is operated by the power supplied from the first power supply means 1000 when the second switch unit 400 is turned on.

The first switch unit 300 is configured by a switching circuit or the like using a transistor and switches the supply/non-supply of power from the first power supply means 1000 to the pointer instrument 30 and the light source 22a of the display device 20 under the control of the first control unit 100 (the power is supplied during on time and the power is non-supplied during off time).

The second switch unit 400 is configured by a switching circuit or the like using a transistor and switches the supply/non-supply of power from the first power supply means 1000 to the external memory 500 under the control of the second control unit 200 (the power is supplied during on time and the power is non-supplied during off time).

Next, a data rewriting process that is executed by the cooperation of the first control unit 100 and the second control unit 200 will be described with reference to FIG. 3(a) and FIG. 3(b).

For example, the first control unit 100 starts to execute a process in response to the power supplied from the first power supply means 1000.

As shown in FIG. 3(a), when the process is started, the first control unit 100 causes the first switch unit 300 to be turned on (Step A1) and supplies power from the first power supply means 1000 to the motor 31, the first light source 33, the second light source 34 and the light source 22*a* of the display device 20. In this way, each of the components is operated under the control of the first control unit 100.

Subsequently, the first control unit 100 controls the operation of the second power supply means 2000 to supply power to the second control unit 200 (Step A2). The second control unit 200 starts to execute a process in response to the power supplied from the second power supply means 2000.

Figure 3:
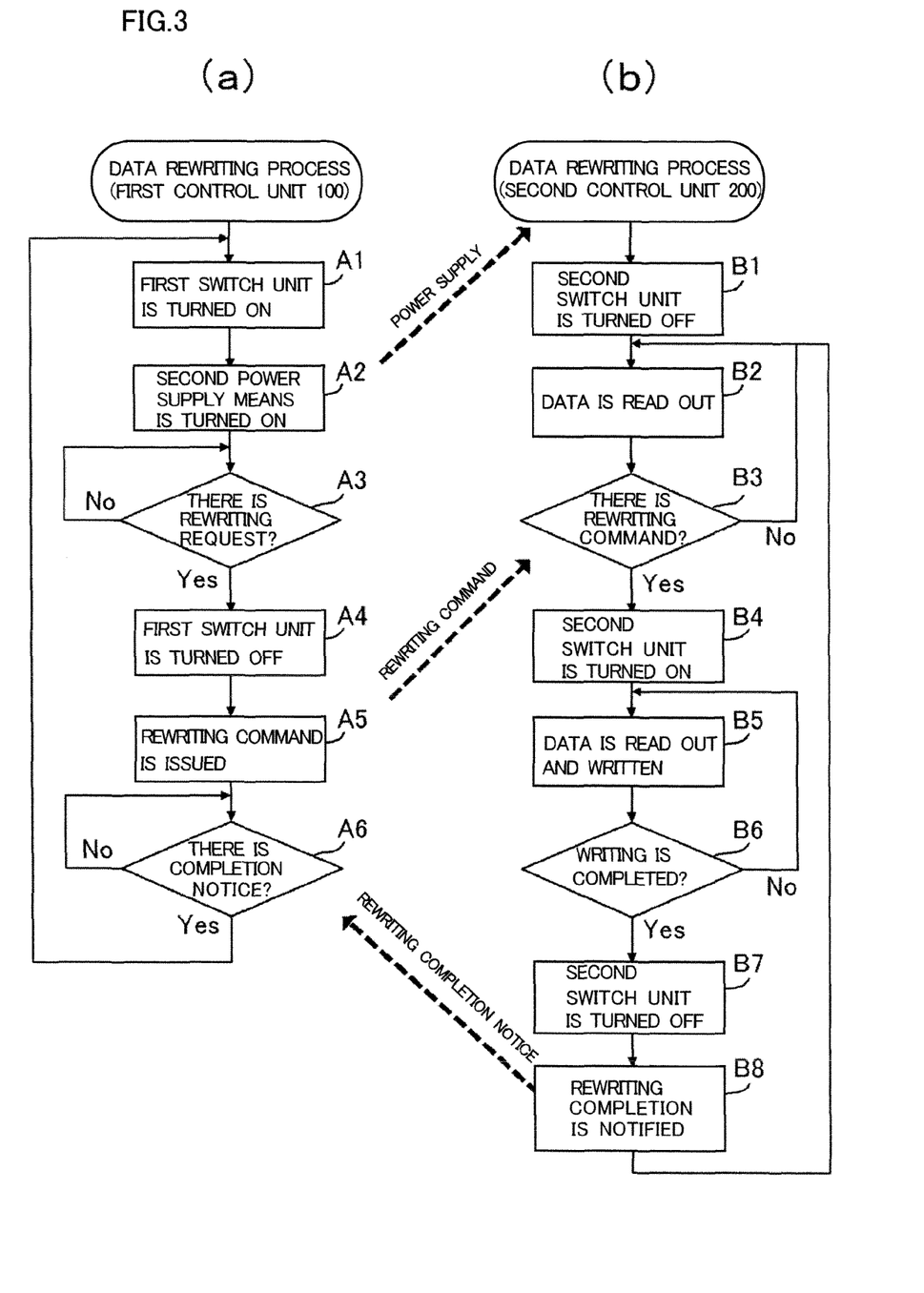
FIG. 3(a) is a flow chart of a data rewriting process that is executed by a first control unit and FIG. 3(b) is a flow chart of a data rewriting process that is executed by a second control unit.

As shown in FIG. 3(*b*), when the process is started, the second control unit 200 causes the second switch unit 400 to be turned off (Step B1). In this way, there is no case that the power from the first power supply means 1000 is immediately supplied to the external memory 500 even when the external memory 500 is connected to the terminal of the instrument device 1.

Subsequently, the second control unit 200 reads out the image data or data relating to the application software from the non-volatile memory 210 (Step B2). Based on the data read out, the second control unit 200 controls a display operation of the liquid crystal panel 21. In this way, a predetermined image is displayed on the display area 20*a*.

That is, by the processing of Steps A1, A2 and Steps B1, B2, the instrument device 1 realizes a normal operation such as an operation of notifying a vehicle speed or the like to the pointer instrument 30 or an operation of displaying an image to notify a vehicle state or the like on the display device 20 (hereinafter, a state of this operation is referred to as "normal operation state").

Returning back to FIG. 3(*a*), when the processing of Step A2 is executed, the first control unit 100 determines whether or not there is a request (hereinafter, referred to as "rewriting request") intended for rewriting the data of the non-volatile memory 210 (Step A3). For example, the rewriting request is executed by the Diagnosis Tester that is a dealer of a vehicle equipped with the instrument device 1 and connected to the first control unit 100. At this time, a dealer worker connects the external memory 500 configured by, e.g., USB memory to the terminal of the instrument device 1 and then operates the Tester. Accordingly, the following process is executed on the assumption that the external memory 500 is connected to the instrument device 1. For example, the rewriting of the data of the non-volatile memory 210 is made for the update of the application software and additional services or the like. Meanwhile, the rewriting of the data of the non-volatile memory 210 can be made by the demand of a user (user-customizable). For example, the writing request may be executed in accordance with a user operation from an operation means (not shown) provided in the instrument device 1.

When there is no rewriting request (Step A3; No), the first control unit 100 keeps the normal operation state of the instrument device 1.

On the other hand, when there is rewriting request (Step A3: Yes), the first control unit 100 causes the first switch unit 300 to be turned off (Step A4) and causes the first power supply means 1000 to stop supplying power to the pointer instrument 30 (the motor 31, the first light source 33 and the second light source 34) and the light source 22*a* of the display device 20. In this way, the operation of each of these components is stopped and the output current of the first power supply means 1000 is suppressed. At this time, the first control unit 100 does not control the pointer instrument 30 and the light source 22*a*, but continues only its own operation and CAN communication with the outside. Hereinafter, a state of the instrument device 1 is referred to as "data rewritable state" when the first control unit 100 is in such a state.

When the processing of Step A4 is executed, the first control unit 100 issues a command (hereinafter, referred to as "rewriting command") to the second control unit 200 (Step A5). The rewriting command is intended for rewriting the data of the non-volatile memory 210.

As shown in FIG. 3(*b*), when the processing of Step B2 is executed, the second control unit 200 determines whether or not there is a rewrite command from the first control unit 100 (Step B3).

When there is no rewrite command (Step B3; No), the second control unit 200 keeps the normal operation state of the instrument device 1.

On the other hand, when there is rewriting request (Step B3: Yes), the second control unit 200 causes the second switch unit 400 to be turned on (Step B4) and causes the first control means 1000 to supply power to the external memory 500. In this way, the external memory 500 can be operated.

When the processing of Step B4 is executed, the second control unit 200 reads out data from the external memory 500 and writes the data read out on the non-volatile memory 210 (Step B5). That is, here, the second control unit 200 executes a process of rewriting the data of the non-volatile memory 210.

When writing is not yet completed (Step B6; No), the second control unit 200 continues to execute the processing of Step B5. On the other hand, when writing is completed (Step B6; Yes), the second control unit 200 causes the second switch unit 400 to be turned off (Step B7) and issues a notice (rewriting completion notice) of notifying that the rewriting of the data of the non-volatile memory 210 is completed to the first control unit 100 (Step B8).

Returning back to FIG. 3(*a*), when the processing of Step A5 is executed, the first control unit 100 determines whether or not there is a rewriting completion notice from the second control unit 200 (Step A6).

When there is no rewriting completion notice (Step A6; No), the first control unit 100 is in a standby state.

On the other hand, when there is rewriting completion notice (Step A6; Yes), the first control unit 100 returns the process to Step A1. Further, as shown in FIG. 3(*b*), when the processing of Step B8 is executed, the second control unit 200 returns the process to Step B2. In this way, the operation of the instrument device 1 is returned to the normal operation state.

According to the power supply control device for executing the data rewriting process described above and the instrument device 1 equipped with the power supply control device, it is possible to suppress the current supply capacity required by the power supply means even in the case of supplying power to the external memory 500 (an example of a predetermined external device). The reason will be described below.

For example, it is assumed that, in the normal operation state of the instrument device 1, the value of current outputted to the first control unit 100 and the pointer instrument 30 from the first power supply means 1000 is 450 mA. Here, assuming that the value of the current consumption of the external memory 500 is 500 mA, in the power supply control device where the data rewriting process as described above is not executed, the current supply capacity (rated output current) required by the first power supply means 1000 must exceed 950 mA that is the sum of 450 mA and 500 mA.

However, according to the power supply control device and the instrument device 1 where the data rewriting process unique to the present embodiment is executed, in the data rewritable state, the operation of the pointer instrument 30 is stopped and the first control unit 100 continues only its own operation and CAN communication with the outside. In this state, the value of current outputted to the first control unit 100 from the first power supply means 1000 is about 200 mA and the current supply capacity (rated output current) required by the first power supply means 1000 is 750 mA exceeding 700 mA that is the sum of 200 mA and 500 mA. In this way, according to the present embodiment, the current supply capacity required by the power supply means can be suppressed. Therefore, it is also possible to reduce the cost of the power supply IC.

The above effects are realized by the following configurations.

The power supply control device according to the present embodiment includes the first power supply means 1000 configured to supply power to the pointer instrument 30 that notifies a predetermined measurement amount by a comparison between the rotating pointer 32 and the indicator part 410 indicated by the pointer 32; the first control unit 100 operated by the power supplied from the first power supply means 1000 and configured to control driving of the pointer instrument 30 and supply of power from the first power supply means 1000 to the pointer instrument 30; and the second control unit 200 capable of being electrically connected to the external memory 500 (an example of a prescribed external device) and configured to control supply of power from the first power supply means 1000 to the external memory 500. The external memory 500 is operated by the power supplied from the first power supply means 1000. Upon receiving a prescribed input command, the first control unit 100 causes the first power supply means 1000 to stop supplying power to the pointer instrument 30. In response to the stoppage, the second control unit 200 causes the first power supply means 1000 to start supplying power to the external memory 500 that is electrically connected to the second control unit 200.

Meanwhile, the second control unit 200 is operated by the power supplied from the second power supply means 2000 different from the first power supply means 1000, controls a display operation of the liquid crystal panel 21 (an example of a display means) to display a prescribed image and controls supply of power from the first power supply means 1000 to the external memory 500.

Further, the power supply control device according to the present embodiment further includes the non-volatile memory 210 connected to the second control unit 200 and configured to store data required when the second control unit 200 controls the display operation of the liquid crystal panel 21. The second control unit 200 is capable of rewriting the data stored in the non-volatile memory 210. The external memory 500 is where data to be rewritten is stored. Upon receiving a rewriting request of the data, the first control unit 100 causes the first power supply means 1000 to stop supplying power to the pointer instrument 30. In response to the stoppage, the second control unit 200 causes the first power supply means 1000 to start supplying power to the external memory 500 that is electrically connected to the second control unit 200, reads out the data to be rewritten of the external memory 500 and rewrites the data stored in the non-volatile memory 210 with the data to be rewritten read out from the external memory 500.

With this configuration, the rewriting of data, which has been performed by a conventional CAN communication, can be performed by a USB memory having a high-speed interface. Accordingly, it is also possible to shorten the rewriting time of data. Meanwhile, in the present embodiment, it is not a state where power is immediately supplied even when the external memory 500 configured by the USB memory is connected to the instrument device 1 (the second control unit 200). That is, even in the case of the USB memory, it is not a so-called Plug & Play. By intentionally doing so, power can be supplied to the external memory 500 in a state where the current consumption of the whole instrument device 1 is suppressed. As a result, it is possible to suppress the current supply capacity required by the power supply means.

Further, the power supply control device according to the present embodiment further includes the first switch unit 300 operated under the control of the first control unit 100 and configured to switch whether or not to supply power from the first power supply means 1000 to the pointer instrument 30; and the second switch unit 400 operated under the control of the second control unit 200 and configured to switch whether or not to supply power from the first power supply means 1000 to the external memory 500. Upon receiving the prescribed input command, the first control unit 100 causes the first switch unit 300 to stop supply of power from the first power supply means 1000 to the pointer instrument 30. In response to the stoppage, the second control unit 200 causes the second switch unit 400 to start supply of power from the first power supply means 1000 to the external memory 500 that is electrically connected to the second control unit 200.

Further, the instrument device 1 according to the present embodiment includes the power supply control device, the pointer instrument 30 and the liquid crystal panel 21.

Meanwhile, the present invention is not limited by the illustrative embodiments and drawings described above. It is possible to appropriately make a change (also including deletion of components) without departing from the gist of the present invention. Hereinafter, an example of a modified embodiment is described.

Modified Embodiment

In the above description, the external memory 500 has been employed as an example of the external device that is connected to the second control unit 200 and operated by the power supplied from the first power supply means 1000. However, the present invention is not limited thereto. Any external device can be employed, so long as the external device can be electrically connected to the second control unit 200 and operated by the power supplied from the first power supply means 1000 and the function of the pointer instrument 30 is not required during the operation of the external device.

Further, in order to further reduce the output current of the first power supply means 1000 in the data rewritable state, the first control unit 100 may be in an operation stop state. In this case, with respect to a vehicle network, the rewriting of data is completed and then the second control unit 200 activates the first control unit 100. Thereafter, the status of the rewriting completion is issued and resumption of communication becomes possible. By doing so, for example, the first power supply means 1000 configured by a power supply of 5V and having a rated output of 500 mA can be made more inexpensive, so that it is also possible to achieve further cost reduction.

In the above description, the light source 22a of the display device 20 is also turned off in the data rewritable state. However, the light source 22a of the display device 20 may not be turned off. Further, in the data rewritable state, an operation of only a part (e.g., only the motor 31) of the components for driving the pointer instrument 30 may be stopped. Even in this case, in the data rewritable state, the pointer instrument 30 cannot exhibit the normal function. Accordingly, in a broader sense, it can be said that supply of power from the first power supply means 1000 to the pointer instrument 30 is stopped.

In the above description, an explanation of known technical matters which are not important is properly omitted in order to facilitate the understanding of the present invention.

INDUSTRIAL APPLICABILITY

The present invention can be applied to a power supply control device and an instrument device equipped with the power supply control device.

REFERENCE SIGNS LIST

1 Instrument Device
2 Instrument Body
10 Circuit Board
20 Display Device
21 Liquid Crystal Panel
22 Backlight
22a Light Source
30 Pointer Instrument
31 Motor
32 Pointer
33 First Light Source
34 Second Light Source
410 Indicator part
100 First Control Unit
200 Second Control Unit
210 Non-volatile Memory
300 First Switch Unit
400 Second Switch Unit
500 External Memory
1000 First Power Supply Means
2000 Second Power Supply Means

The invention claimed is:

1. A power supply control device comprising:
a first power supply configured to supply power to a pointer instrument that notifies a predetermined measurement amount by a comparison between a rotating pointer and an indicator indicated by the pointer;
a first control unit operated by the power supplied from the first power supply and configured to control driving of the pointer instrument and supply of power from the first power supply means to the pointer instrument; and
a second control unit capable of being electrically connected to a prescribed external device and configured to control supply of power from the first power supply to the external device,
wherein the external device is operated by the power supplied from the first power supply, upon receiving a prescribed input command, the first control unit causes the first power supply to stop supplying power to the pointer instrument and, in response to the stoppage, the second control unit causes the first power supply to start supplying power to the external device that is electrically connected to the second control unit, and
the second control unit is operated by the power supplied from a second power supply different from the first power supply, controls a display operation of a display to display a prescribed image, and controls supply of power from the first power supply to the external device.

2. The power supply control device according to claim 1, further comprising a non-volatile memory connected to the second control unit and configured to store data required when the second control unit controls the display operation of the display,
wherein the second control unit is capable of rewriting the data stored in the non-volatile memory,
the external device is an external memory where data to be rewritten of the data is stored, and
upon receiving a rewriting request of the data, the first control unit causes the first power supply to stop supplying power to the pointer instrument and, in response to the stoppage, the second control unit causes the first power supply to start supplying power to the external device that is electrically connected to the second control unit, reads out the data to be rewritten of the external memory and rewrites the data stored in the non-volatile memory with the data to be rewritten read out from the external memory.

3. The power supply control device according to claim 2, further comprising:
a first switch unit operated under the control of the first control unit and configured to switch whether or not to supply power from the first power supply to the pointer instrument; and
a second switch unit operated under the control of the second control unit and configured to switch whether or not to supply power from the first power supply to the external device,
wherein, upon receiving the prescribed input command, the first control unit causes the first switch unit to stop supply of power from the first power supply to the pointer instrument and, in response to the stoppage, the second control unit causes the second switch unit to start supply of power from the first power supply to the external device that is electrically connected to the second control unit.

4. The power supply control device according to claim 1, further comprising:
a first switch unit operated under the control of the first control unit and configured to switch whether or not to supply power from the first power supply to the pointer instrument; and
a second switch unit operated under the control of the second control unit and configured to switch whether or not to supply power from the first power supply to the external device,
wherein, upon receiving the prescribed input command, the first control unit causes the first switch unit to stop supply of power from the first power supply to the pointer instrument and, in response to the stoppage, the second control unit causes the second switch unit to start supply of power from the first power supply to the external device that is electrically connected to the second control unit.

5. An instrument device comprising:
a pointer instrument that notifies a predetermined measurement amount by a comparison between a rotating pointer and an indicator indicated by the pointer;
a display; and
a power supply control device comprising:
a first power supply configured to supply power to the pointer instrument;

a first control unit operated by the power supplied from the first power supply and configured to control driving of the pointer instrument and supply of power from the first power supply to the pointer instrument; and a second control unit capable of being electrically connected to a prescribed external device and configured to control supply of power from the first power supply to the external device, wherein the external device is operated by the power supplied from the first power supply, upon receiving a prescribed input command, the first control unit causes the first power supply to stop supplying power to the pointer instrument and, in response to the stoppage, the second control unit causes the first power supply to start supplying power to the external device that is electrically connected to the second control unit, and the second control unit is operated by the power supplied from a second power supply different from the first power supply, controls a display operation of the display to display a prescribed image, and controls supply of power from the first power supply to the external device.

6. An instrument device comprising:

a pointer instrument that notifies a predetermined measurement amount by a comparison between a rotating pointer and an indicator indicated by the pointer;

a display; and a power supply control device comprising:

a first power supply configured to supply power to the pointer instrument;

a first control unit operated by the power supplied from the first power supply and configured to control driving of the pointer instrument and supply of power from the first power supply to the pointer instrument;

a second control unit capable of being electrically connected to a prescribed external device and configured to control supply of power from the first power supply to the external device, wherein the external device is operated by the power supplied from the first power supply, upon receiving a prescribed input command, the first control unit causes the first power supply to stop supplying power to the pointer instrument and, in response to the stoppage, the second control unit causes the first power supply to start supplying power to the external device that is electrically connected to the second control unit, and the second control unit is operated by the power supplied from a second power supply different from the first power supply, controls a display operation of the display to display a prescribed image, and controls supply of power from the first power supply to the external device, and the power supply control device further comprises a non-volatile memory connected to the second control unit and configured to store data required when the second control unit controls the display operation of the display, wherein the second control unit is capable of rewriting the data stored in the non-volatile memory, the external device is an external memory where data to be rewritten is stored, and upon receiving a rewriting request of the data, the first control unit causes the first power supply to stop supplying power to the pointer instrument and, in response to the stoppage, the second control unit causes the first power supply to start supplying power to the external device that is electrically connected to the second control unit, reads out the data to be rewritten of the external memory and rewrites the data stored in the non-volatile memory with the data to be rewritten read out from the external memory.

7. An instrument device comprising:

a pointer instrument that notifies a predetermined measurement amount by a comparison between a rotating pointer and an indicator indicated by the pointer;

a display; and a power supply control device comprising:

a first power supply configured to supply power to the pointer instrument;

a first control unit operated by the power supplied from the first power supply and configured to control driving of the pointer instrument and supply of power from the first power supply to the pointer instrument;

a second control unit capable of being electrically connected to a prescribed external device and configured to control supply of power from the first power supply to the external device, wherein the external device is operated by the power supplied from the first power supply, upon receiving a prescribed input command, the first control unit causes the first power supply to stop supplying power to the pointer instrument and, in response to the stoppage, the second control unit causes the first power supply to start supplying power to the external device that is electrically connected to the second control unit, and the second control unit is operated by the power supplied from a second power supply different from the first power supply, controls a display operation of the display to display a prescribed image, and controls supply of power from the first power supply to the external device, the power supply control device further comprises:

a first switch unit operated under the control of the first control unit and configured to switch whether or not to supply power from the first power supply to the pointer instrument; and a second switch unit operated under the control of the second control unit and configured to switch whether or not to supply power from the first power supply to the external device, wherein, upon receiving the prescribed input command, the first control unit causes the first switch unit to stop supply of power from the first power supply to the pointer instrument and, in response to the stoppage, the second control unit causes the second switch unit to start supply of power from the first power supply to the external device that is electrically connected to the second control unit.

* * * * *